United States Patent
Metke et al.

(10) Patent No.: US 9,420,465 B2
(45) Date of Patent: Aug. 16, 2016

(54) METHOD AND APPARATUS FOR DEVICE COLLABORATION VIA A HYBRID NETWORK

(71) Applicant: MOTOROLA SOLUTIONS, INC, Schaumburg, IL (US)

(72) Inventors: Anthony R. Metke, Naperville, IL (US); Thomas J. Senese, Schaumburg, IL (US)

(73) Assignee: MOTOROLA SOLUTIONS, INC, Schaumburg, IL (US)

( * ) Notice: Subject to any disclaimer, the term of this patent is extended or adjusted under 35 U.S.C. 154(b) by 2 days.

(21) Appl. No.: 14/587,389

(22) Filed: Dec. 31, 2014

(65) Prior Publication Data

US 2016/0192189 A1    Jun. 30, 2016

(51) Int. Cl.
| | |
|---|---|
| *H04W 12/06* | (2009.01) |
| *H04W 4/00* | (2009.01) |
| *H04W 28/02* | (2009.01) |
| *H04W 88/06* | (2009.01) |

(52) U.S. Cl.
CPC .............. *H04W 12/06* (2013.01); *H04W 4/008* (2013.01); *H04W 28/0215* (2013.01); *H04W 88/06* (2013.01)

(58) Field of Classification Search
CPC . H04W 88/06; H04W 36/0094; H04W 36/32; H04M 3/42136
See application file for complete search history.

(56) References Cited

U.S. PATENT DOCUMENTS

| | | | |
|---|---|---|---|
| 6,865,371 B2 | 3/2005 | Salonidis et al. | |
| 7,095,748 B2 | 8/2006 | Vij et al. | |
| 7,894,447 B2 * | 2/2011 | Khan | H04L 45/00 370/395.21 |
| 8,391,918 B2 * | 3/2013 | Ekici | H04W 48/18 455/428 |
| 2003/0069989 A1 | 4/2003 | Silvester | |
| 2005/0113102 A1 | 5/2005 | Kwon et al. | |
| 2005/0122944 A1 | 6/2005 | Kwon et al. | |
| 2007/0010261 A1 * | 1/2007 | Dravida | G01S 5/0009 455/456.3 |
| 2007/0281685 A1 | 12/2007 | Pan et al. | |
| 2008/0066181 A1 * | 3/2008 | Haveson | H04N 21/4788 726/26 |
| 2014/0297799 A1 * | 10/2014 | Gordon | H04N 21/4384 709/217 |

FOREIGN PATENT DOCUMENTS

| | | |
|---|---|---|
| EP | 1503549 B1 | 5/2008 |
| EP | 2434834 A2 | 3/2012 |
| WO | WO0208857 A2 | 1/2002 |

* cited by examiner

*Primary Examiner* — Cong Tran

(57) ABSTRACT

A collaboration manager server is provided that bridges a PAN with a WAN. When the collaboration manager server receives, from the first mobile device, a request to establish a second network service, wherein the second network service provides for bridging a PAN with a WAN, the collaboration manager server determines a credential to be used by mobile devices who wish to join the second network service and, in response to determining that the first mobile device is authorized to make such a request, establishes the second network service. Further, in response to receiving, from a second mobile device, a request to join the second network service, wherein the request to join the second network service comprises the credential, the collaboration manager server joins the second mobile device to the second network service and bridges traffic between the first mobile device and the second mobile device using the second network service.

8 Claims, 3 Drawing Sheets

METHOD AND APPARATUS FOR DEVICE COLLABORATION VIA A HYBRID NETWORK

CROSS-REFERENCE TO RELATED APPLICATIONS

This application is related to U.S. patent application Ser. No. 14/587,409, filed on the same date as this application, which application is assigned to Motorola Solutions, Inc., and which application is hereby incorporated herein in its entirety.

FIELD OF THE INVENTION

The present invention relates generally to wireless communication systems, and, in particular, to device collaboration via a hybrid wireless network.

BACKGROUND OF THE INVENTION

Device collaboration is a set of features that allows multiple devices under control of a single user to take advantage of capabilities of the other collaborating devices via a link between them, that is, a collaborative interface. For example, one collaborating device may hop through another device with better connectivity to reach a network service, or one device may access context or other information (such as address book information) on a peer collaborating device. A more specific example would include a Land Mobile Radio (LMR) device and a broadband device. Under non-collaborative operation, the LMR device is not able to access data services that are only available on broadband networks. Through collaboration, the LMR device is able to access broadband data services via the broadband device. More advanced collaborative features would allow user single sign-on (SSO) status to be shared among collaborating devices, or would allow a user to start an application on one device, and pause it and continue on another device.

Collaborative devices have a special relationship with each other in that they can be considered to be working together on behalf of a user. It would not be unreasonable to consider collaborating devices to be a single multiprocessor "virtual device," with each processor connected by a wireless bus (that is, the collaborative interface). From a security point of view, this "virtual device" model is a good analogy because new and advanced collaborative features will demand the same type of security between devices that is expected over a single internal platform bus.

Personal Area Networks (PANs), such as Bluetooth (BT), are well suited for device collaboration communications. Because PAN technologies, such as BT, require a user to physically pair the devices (for example, via a Personal Identification Number (PIN) entry or a Near Field Communication (NFC) pairing), it is simple for a user to provide the necessary security needed for such a collaborative interface through the user's personal physical security. Further, BT allows for sophisticated inter-device security (with strong key derivation and device authentication) initiated only by the user touching the devices together (for example, when NFC is used).

However, instances arise when a user has a number of devices that are collaborating and sufficiently separates the devices such that they no longer can collaborate over the PAN. For example, a public safety officer may exit his car and leave one of his collaborating devices behind, traveling out of PAN range of the device in the car. For a variety of reasons, the user may still want to take advantage of the collaborative features of the device left behind.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
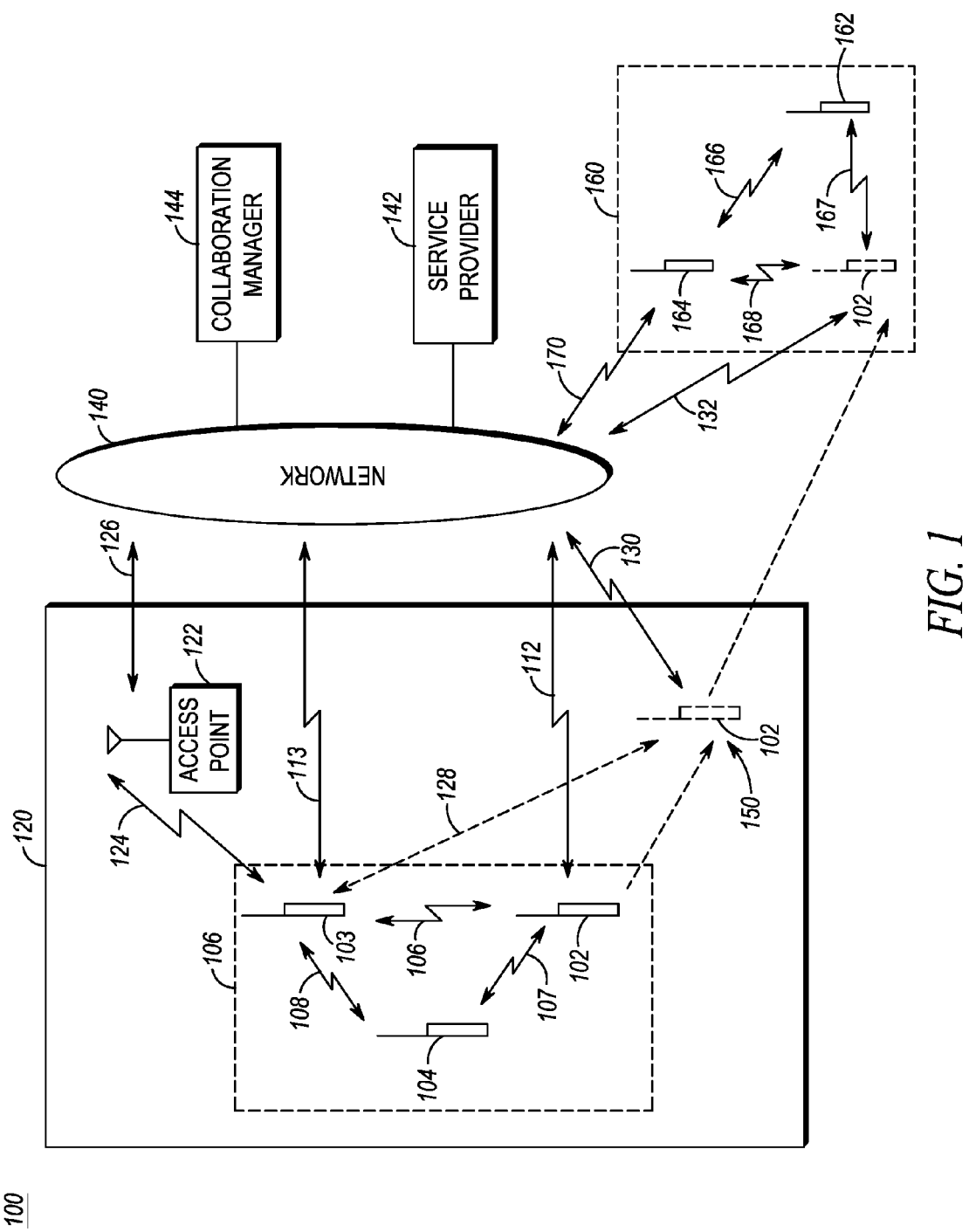
FIG. 1 is a block diagram of a wireless communication system in accordance with some embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for utilizing collaborative features of a first mobile device left behind when a user carries a second collaborating mobile device out of range of the first mobile device, a communication system is provided wherein a user has multiple devices that are collaborating with each other via a Personal Area Network (PAN). When the user exits his car and leaves one of his collaborating devices in the car, and travels out of PAN range of the device in the car, the communication system provides for the user to take advantage of the collaborative features the device left behind in the car by bridging the PAN with a WAN via a collaboration manager server. When the collaboration manager server receives, from the first mobile device, a request to establish a second network service, wherein the second network service provides for bridging a PAN with a WAN, the collaboration manager server determines a credential to be used by mobile devices who wish to join the second network service and, in response to determining that the first mobile device is authorized to make such a request, establishes the second network service. Further, in response to receiving, from a second mobile device, a request to join the second network service, wherein the request to join the second network service comprises the credential, the collaboration manager server joins the second mobile device to the second network service and bridges traffic between the first mobile device and the second mobile device using the second network service.

In other embodiments, when the first mobile device detects a disconnection of a PAN connection to a second mobile device, the first mobile device determines a credential to be used by mobile devices who wish to join a network service, wherein the network service comprises bridging the PAN with the WAN via a collaboration manager server requests an establishment of the network service at collaboration manager server using the credential, joins the network service at the collaboration manager server; and conveys traffic by the first mobile device to the second mobile device using the network service.

Generally, an embodiment of the present invention encompasses a method for bridging a Personal Area Network (PAN) with a wide area network (WAN) at an access point (AP). The method includes receiving, from a first mobile device, a request to authenticate with a collaboration manager service for a first network service; receiving, from the first mobile device, a request to establish a second network service, wherein the second network service provides for bridging a PAN with a WAN via a collaboration manager server; determining a credential to be used by mobile devices who wish to join the second network service; determining that the first mobile device is authorized to make such a request; and establishing the second network service. The method further includes receiving, from a second mobile device, a request to join the second network service, wherein the request to join the second network service comprises the credential; joining the second mobile device to the second network service; and in response to joining the second mobile device to the second network service, bridging traffic between the first mobile device and the second mobile device using the second network service.

Another embodiment of the present invention encompasses a method for bridging a PAN with a WAN. The method includes detecting, by a first mobile device, a disconnection of a PAN connection to a second mobile device; determining, by the first mobile device, a credential to be used by mobile devices who wish to join a network service, wherein the network service comprises bridging the PAN with the WAN via a collaboration manager server; requesting, by the first mobile device, an establishment of the network service at collaboration manager server using the credential; joining, by the first mobile device, the network service at the collaboration manager server; and conveying traffic by the first mobile device to the second mobile device using the network service.

Yet another embodiment of the present invention encompasses a collaboration manager server capable of bridging a PAN with a WAN. The collaboration manager server includes a processor and an at least one memory device. The at least one memory device is configured to store a set of instructions that, when executed by the processor, perform the following functions: receive, from a first mobile device, a request to authenticate with an access point for a first network service; receive, from the first mobile device, a request to establish a second network service, wherein the second network service provides for bridging a PAN with a WAN; determine a credential to be used by mobile devices who wish to join the second network service; determine that the first mobile device is authorized to make such a request; and establish the second network service. The set of instructions that, when executed by the processor, further perform the following functions: receive, from a second mobile device, a request to join the second network service, wherein the request to join the second network service comprises the credential; join the second mobile device to the second network service; and in response to joining the second mobile device to the second network service, bridge traffic between the first mobile device and the second mobile device using the second network service.

Still another embodiment of the present invention encompasses an apparatus capable of bridging a PAN with a WAN. The apparatus includes a first mobile device comprising a processor and an at least one memory device that is configured to store a set of instructions that, when executed by the processor, perform the following functions: detect a disconnection of a PAN connection to a second mobile device; determine a credential to be used by mobile devices who wish to join a network service, wherein the network service comprises bridging the PAN with the WAN via a collaboration manager server; request an establishment of the network service at the collaboration manager server using the credential; join the network service at the collaboration manager server; and convey traffic by the first mobile device to the second mobile device using the network service.

The present invention may be more fully described with reference to FIGS. 1-5. FIG. 1 is a block diagram of a wireless communication system 100 in accordance with some embodiments of the present invention. Communication system 100 includes a first set of multiple mobile devices 102-104 (two shown), such as a broadband capable smart phone, a laptop computer, a land mobile radio (LMR), or a tablet, personal data assistant (PDA), or laptop computer with wireless capabilities. Each of the multiple mobile devices 102-104 is configured to operate on a narrowband network or a broadband network and to communicate with infrastructure devices in the corresponding network using any suitable over-the-air protocol and modulation scheme.

In one embodiment, each of the multiple mobile devices 102-104 communicate directly with each other, that is, engage in a peer-to-peer wireless communication with each other, over a first Personal Area Network (PAN) 106. In another embodiment, some of the multiple mobile devices may have to communicate with each other over PAN 106 via one or more of the other mobile devices. For example, as depicted in FIG. 1, mobile device 102 communicates with mobile device 103 via a wireless link 106, mobile device 102 communicates with mobile device 104 via a wireless link 107, and mobile device 103 communicates with mobile device 104 via a wireless link 108, wherein each of wireless links 106-108 is a short range wireless link, such as Bluetooth. Mobile devices 102-104, which communicate with each other and are under the control of a single user, may be referred to herein as collaborating devices, and the wireless links over which the collaborating devices communicate may be referred to herein as collaborative links.

The multiple mobile devices 102-104 also communicate with infrastructure devices of a wide area narrowband or broadband network (WAN) 140 via a corresponding wireless link and, via WAN 140, with one or more service providers 142 and a collaboration manager server (CM) 144. For example, mobile device 102 communicates with WAN 140 via a first wireless link 112 and mobile device 103 communicates with WAN 140 via a second wireless link 113. In various embodiments of the present invention, WAN 140 need not be a single network as illustrated, but could include multiple wireless networks interconnected by forwarding equipment. In such embodiments, one of the multiple mobile devices 102-104 may be served by a different wireless network of the multiple wireless networks and a different service provider of the one or more service providers than other mobile devices of the multiple mobile devices. For example, one of the multiple mobile devices 102-104 may be a broadband device that communicates with a broadband wireless network, such as a Third Generation Partnership Project Long Term Evolution (3GPP LTE) network, and another of the multiple mobile devices 102-104 may be a narrowband device that communicates with a narrowband wireless network, such as a Public Safety Narrowband (PSNB) network.

In another embodiment of the present invention, communication system 100 further may include a second set of multiple mobile devices 162, 164 (two shown) that communicate directly with each other, that is, engage in a peer-to-peer wireless communication with each other over a second PAN 160 via a short range wireless link, such as link 166 between mobile devices 162 and 164. Each of the second set of multiple mobile devices 162, 164 is configured to operate on a narrowband network or a broadband network and to communicate with infrastructure devices in the corresponding network using any suitable over-the-air protocol and modulation scheme. Each of the multiple mobile devices 162, 164 also communicate with infrastructure devices of WAN 140 via a corresponding wireless link and, via WAN 140, with one or more service providers 142 and a collaboration manager server (CM) 144. For example, mobile device 164 communicates with WAN 140 via a wireless link 170.

Communication system 100 optionally further may include an access point (AP) 122 that provides wireless services to each mobile device residing in a coverage area of the AP, such as the first set of mobile devices 102-104, via a first network service, that is, a local area network (LAN) 120, served by the AP over a bi-directional local area network link 124, such as Wi-Fi. Further, AP 122 communicates with infrastructure devices of a wide area narrowband or broadband network (WAN) 140 serving the AP via a corresponding narrowband or broadband WAN link 126.

A first mobile device of the multiple collaborative mobile devices 102-104, such as mobile device 103, may be designated as a master device (referred to herein as a 'PAN master device'), and the other mobile devices, that is, a second mobile device 102 and a third mobile device 104, then are slave devices (referred to herein as 'PAN slave devices'). The PAN master device is a mobile device that serves as a relay node for the collaborative devices 102-104, that is, for PAN 106, when one of the collaborating mobile devices 102-104 roams outside of the PAN. For example, when a mobile device 102 roams outside of PAN 106, the mobile device may communicate with other collaborating mobile devices 103, 104 via the PAN master device which, when acting as a relay node between PAN 106 and WAN 140, may be referred to as a Network Access Point (NAP).

Figure 2:
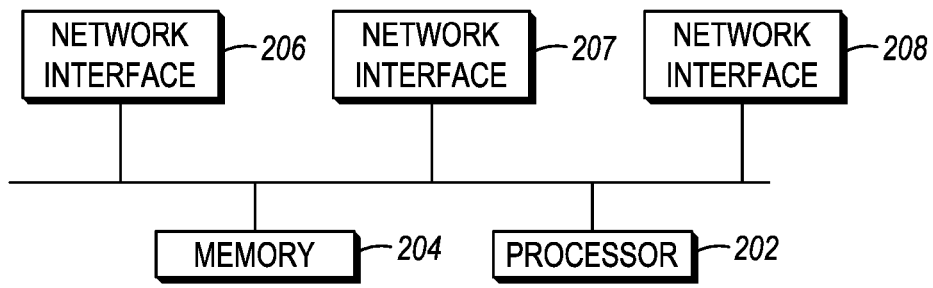
FIG. 2 is a block diagram of a mobile station of the communication system of FIG. 1 in accordance with some embodiments of the present invention.
Figure 3:
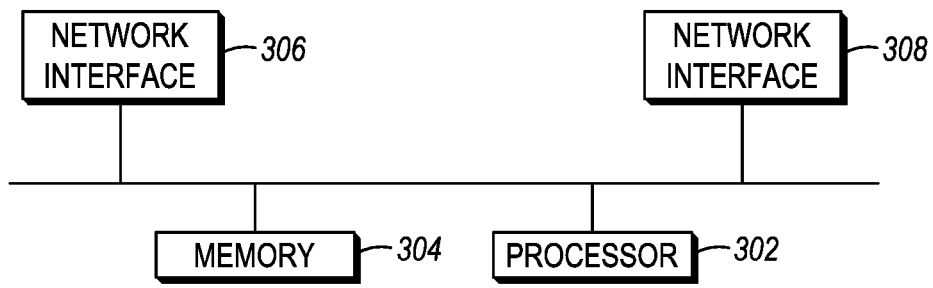
FIG. 3 is a block diagram of an access point of the communication system of FIG. 1 in accordance with some embodiments of the present invention.
Figure 4:
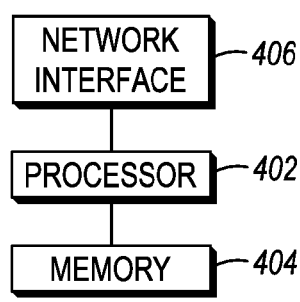
FIG. 4 is a block diagram of a collaboration manager server of the communication system of FIG. 1 in accordance with some embodiments of the present invention.

Referring now to FIGS. 2-4, block diagrams are provided of a mobile device 200, such as mobile devices 102-104, 162, and 164, AP 122, and CM 144 in accordance with an embodiment of the present invention. Each of mobile device 200, AP 122, and CM 144 operates under the control of a respective processor 202, 302, 402, such as one or more microprocessors, microcontrollers, digital signal processors (DSPs), combinations thereof or such other devices known to those having ordinary skill in the art. Each processor 202, 302, 402 operates the corresponding mobile device, AP, or CM according to data and instructions stored in a respective at least one memory device 204, 304, 404 such as random access memory (RAM), dynamic random access memory (DRAM), and/or read only memory (ROM) or equivalents thereof, that stores data and programs that may be executed by the corresponding processor so that the mobile device or AP may perform the functions described herein.

The at least one memory device 204 of mobile device 200 further includes one or more mobile device identifiers, including a Media Access Control (MAC) address and any other identifier(s), such as a subscriber unit identifier (SUID) or an International Mobile Subscriber Identifier (IMSI), that may be used to identify the mobile device in a network in which it is operating. In addition, the at least one memory device 204 of mobile device 200 may include an enhanced collaborative network (ECN) identifier, which may be used by the mobile device to set up a virtual PAN for collaborating devices as described in greater detail below. Also, the at least one memory device 204 of mobile device 200 may include a routing address of CM 144, for example, an Internet Protocol (IP) address and/or a port number, and an identifier of AP 122, such as a Service Set Identifier (SSID). In one embodiment of the present invention, the routing address of CM 144 may serve as, or be included in, the ECN identifier. For example, CM 144 may maintain multiple port numbers. Collaborating mobile devices, such as mobile devices 102-104, that connect to the CM at a same port then may be joined by the CM in an ECN. Further, the at least one memory device 204 of mobile device 200 may include a predetermined key, such as a pre-shared key (PSK), that is shared among all devices that can collaborate with this mobile device.

Mobile device 200 further includes multiple network interfaces 206-208 (three shown) in communication with processor 202, for example, a first network interface 206 for directly communicating with other mobile devices via a short range wireless protocol, a second network interface 207 for communicating with WAN 140 via a WAN protocol, and a third network interface 208 for communicating with AP 122, for example, via a wireless local area network (WLAN) protocol. In various embodiments of the present invention, each of the multiple network interfaces 206-208 may include a radio frequency (RF) receiver (not shown) and an RF transmitter (not shown), or two or more of the multiple network interfaces may share one or both of a RF receiver and transmitter. Similarly, AP 122 includes one or more network interfaces 306, 308 (two shown) in communication with processor 302, such as a first network interface 306 for communicating with mobile devices 102 and 103 and a second network interface 306 for communicating with other APs and/or infrastructure devices of WAN 140. Each of the multiple network interfaces 306, 308, if a wireless interface, may include an RF receiver (not shown) and an RF transmitter (not shown), or they may share one or both of the RF receiver and transmitter. CM 144 also includes a network interface 406 for exchanging communications with elements of WAN 140.

Unless otherwise specified herein, the functionality described herein as being performed by a mobile device, such as mobile devices 102-104, AP 122, and CM 144, is implemented with or in software programs and instructions stored in the respective at least one memory device 204, 304, 404 of the mobile device, AP, and CM and executed by the associated processor 202, 302, 402 of the mobile device, AP, and CM.

Figure 5:
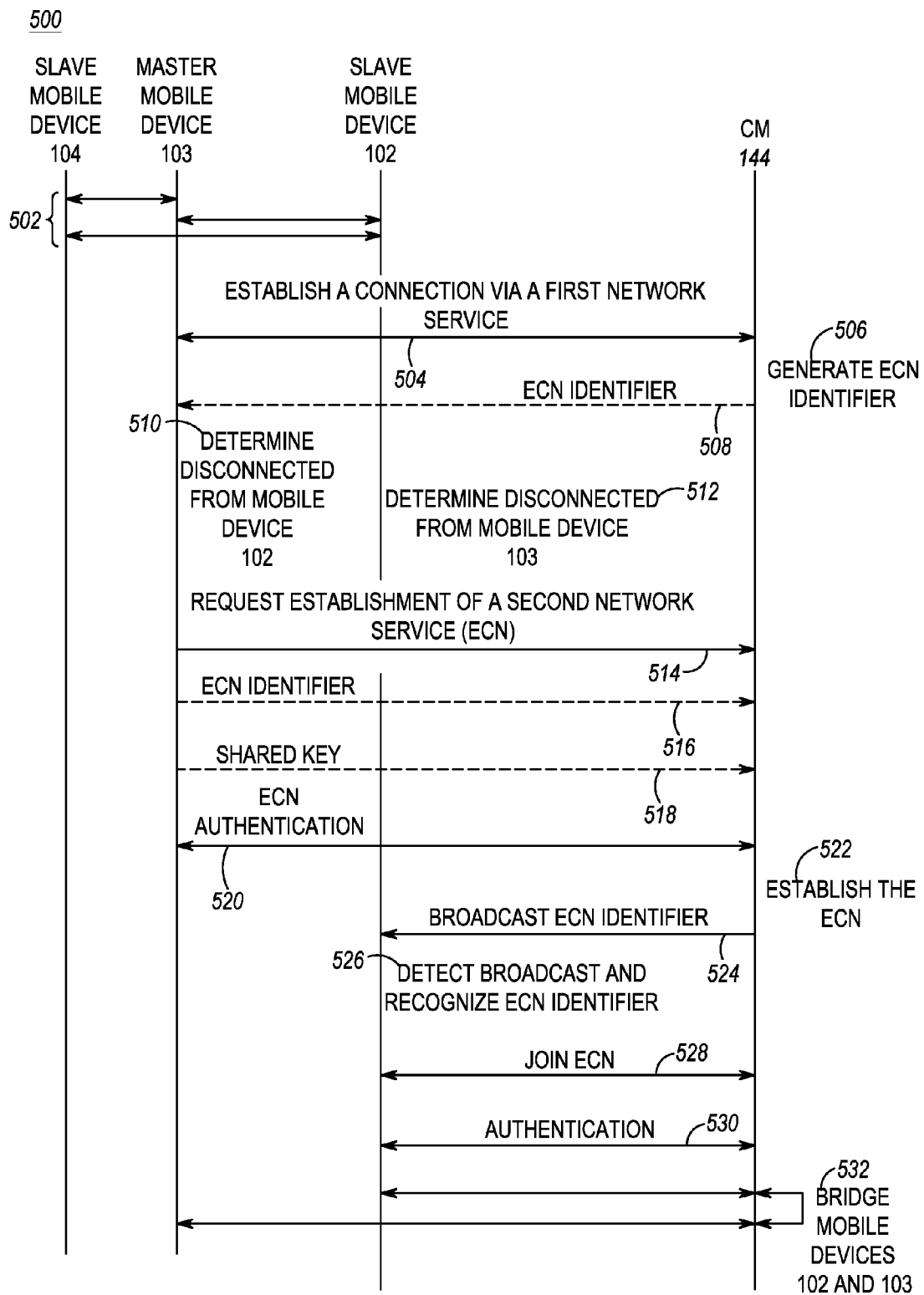
FIG. 5 is a signal flow diagram illustrating a method by which the communication system of FIG. 1 establishes a virtual PAN in accordance with some embodiments of the present invention.

Referring now to FIG. 5, a signal flow diagram 500 is provided that illustrates a method executed by communication system 100 to establish a virtual PAN in accordance with some embodiments of the present invention. Signal flow diagram 500 begins when mobile devices 102-104 are initially paired up (502) in PAN 106 via their first, short range, network interfaces 206 and short range wireless links 106-108. Thus, mobile devices 102-104 may be considered to be collaborating devices and wireless links 106-108 are collaborative links. The collaborating devices 102-104 include a PAN master device, for example, mobile device 103, and one or more PAN slave devices, such as mobile devices 102 and 104.

Further, PAN master device 103 establishes (504), via second network interface 207 of the PAN master device, a connection to CM 144 in association with a first network service, that is, via WAN 140 and wireless link 113. As part of establishing the connection with CM 144, PAN master device 103 may authenticate with CM 144 via a certificate based-authentication protocol as known in the art. PAN master device 103 may establish this connection with CM 144 either before or after determining that a PAN slave device, such as mobile device 102, has disconnected from the PAN master device, as described below.

Subsequent to pairing up with PAN slave devices 102 and 104, PAN master device 103 realizes (510) that a PAN slave device, that is, mobile device 102, no longer is connected to the PAN master device. At around the same time, PAN slave device 102 also realizes (512) that the PAN slave device no longer is connected to PAN master device 103. For example, the disconnection can be a result of a normal event, such as PAN slave device 102 powering down. However, the disconnection instead can be a result of PAN slave device 102 roaming out of range of PAN 106 (for example, roaming to position 150 in FIG. 1, where device 102 may or may not be within range of AP 122). Communication system 100 then provides for bridging the PAN together even though PAN slave device 102 has roamed outside of the PAN.

In response to determining that PAN slave device 102 no longer is connected to PAN master device 103, the PAN master device establishes a connection with CM 144, if not already connected to the CM, and conveys (514) a request to the CM that the CM establish a second network service, referred to herein as an extended collaborative network (ECN), which ECN is identified by an ECN identifier, that is, a credential to be used by mobile devices who wish to join the second network service. The ECN is a virtual PAN, whereby collaborating mobile devices 102-104 may exchange communications with each other via a PAN master device, that is, mobile device 103, and which ECN is accessible only by mobile devices, such as mobile devices 102 and 104, that collaborate with mobile device 103.

In one embodiment of the present invention, when PAN master device 103 connects to CM 144, the CM may generate (506) the ECN identifier, for example, designate a routing address, such as a port number, that will serve as the ECN identifier. The CM then stores the ECN identifier in its at least one memory device 404 and conveys (508) the ECN identifier to the PAN master device. PAN master device 103 then may distribute the ECN identifier to collaborative devices 102 and 104, which collaborative devices then store the ECN identifier in their respective at least one memory device 204. Thus, when a PAN slave device realizes that it has lost its connection to PAN master device 103, the PAN slave device knows the address of the CM 144 via which to join the ECN.

In other embodiments of the present invention, PAN master device 103 may convey (516) the ECN identifier to CM 144 in response to establishing the connection with the CM or in response to requesting the establishment of the ECN. For example, when mobile devices 102-104 initially are paired up in PAN 106, PAN master device 103 may generate an ECN identifier and distribute it to collaborative devices 102 and 104, which collaborative devices then store the ECN in their respective at least one memory device 204. When PAN master device 103 then requests that CM 144 establish the ECN, the PAN master device 103 may convey the ECN identifier to the CM and the CM then stores the ECN identifier in its at least one memory device 404. In such an embodiment, when a PAN slave device realizes that it has lost its connection to PAN master device 103, the PAN slave device may have to detect an overhead message from the CM that includes the ECN identifier, and which further may include a routing address of the CM.

Optionally, PAN master device 103 further may convey (518) to CM 144, after establishing a connection to the CM, a predetermined key maintained by the mobile device and that is shared among all of the collaborating mobile devices, that is, mobile devices 102-104, such as a pre-shared key (PSK). CM 144 then may use the shared key to authenticate each mobile device attempting to join the ECN, using any one of many known session key generation techniques with each subsequent mobile device joining the ECN. For example, in one embodiment of the present invention, CM 144 may use the key generation and management methods included in the Alternate MAC/PHY specification included in Bluetooth version 3.0.

Before the ECN is established, PAN master device 103 authenticates (520) itself with CM 144 by some scheme other than, or in addition to, sending the predetermined key to the CM. For example, PAN master device 103 may authenticate itself via a certificate-based authentication protocol, such as using IPsec (Internet Protocol Security) or TLS (Transport Layer Security), or the PAN master device may provide the CM with a signed assertion that the CM can validate. CM 144 would validate the signature on such an assertion through standard public key crypto-graphical means. For example, CM 144 may acquire a certificate from a Certificate Authority (CA, not shown) for the creator of the assertion and validate the certificate (again, using standard public key cryptographical means) and then retrieve the public key from that certificate to validate the signature on the assertion. The certificate used in this process may include an attribute that indicates that PAN master device 103 is allowed to create an ECN for a given organization (such as a specific public safety agency). The certificate also may include one or more of a derived (from the public key) key an identification of PAN 106, a list of identifiers of mobile devices eligible to join the ECN, a maximum number of mobile devices that can join PAN 106, and the types of nodes that can join the PAN. As used herein, 'type' may indicate any one or more of (1) whether the mobile device is a phone, radio, tablet, personal computer, and so on, (2) whether the mobile device is owned by an agency or by the user, (3) a security level of the mobile device, or (4) a group/squadron/precinct to which the mobile device is assigned.

In response to receiving the request to establish the ECN, and subsequent to authenticating PAN master device 103 if authentication is required, CM 144 establishes (522) the ECN. In one embodiment of the present invention, in establishing the ECN, CM 144 simply may add PAN master device 103 to the ECN after authenticating the PAN master device, without the need for the PAN master device to re-connect with the CM. In another embodiment of the present invention, PAN master device 103 may disconnect from its current connection with CM 144 and re-connect with the CM using the ECN.

Further, in response to receiving the request to establish the ECN, CM 144 begins broadcasting (524), for example, in an overhead message identifying network services supported by WAN 140, and in particular by CM 144, the availability of the second network service at the CM, which broadcast includes the ECN identifier. The broadcasting of the ECN identifier serves to inform that WAN 140, and in particular CM 144, supports the ECN, that is, an inter-mobile device network connection that is restricted to collaborative devices, that is, mobile devices 102-104. The ECN identifier, for example, may include a first data field identifying itself as an ECN identifier, may further include all or part of a routing address for CM 144 that is to be used by the collaborative devices 102-104 in communicating with the CM, and may further include all or part of an identifier of PAN master device 103, for example, a Media Access Control (MAC) address of the mobile device in the PAN (that is, [SSID="ECN":"<BT MAC>"]). All mobile devices joining the ECN then will be bridged by CM 144, for example, at the MAC layer (Layer 2).

When roaming PAN slave device 102 detects (526) the broadcast indicating the availability of the second network service, the PAN slave device determines that it recognizes the ECN identifier included in the broadcast. For example, PAN slave device 102 may compare the detected ECN identifier to an ECN identifier maintained in its at least one memory device 204 and determine that the ECN identifiers match. In response to recognizing the ECN identifier, PAN slave device 102 then joins (528) the ECN. That is, PAN slave device 102 establishes a wireless link 130 with WAN 140 and conveys to CM 144 and based on the routing address of the CM maintained in the at least one memory device 204 of the PAN slave device and/or based on the routing address included in the ECN identifier, the ECN identifier. As part of the joining of the ECN, PAN slave device 102 further may authenticate (530) with CM 144 using the predetermined, that is, pre-shared key maintained by the PAN slave device and that is conveyed to the CM by PAN master device 103.

In other embodiments of the present invention, PAN slave device 102 may authenticate itself with CM 144 by some scheme other than, or in addition to, sending the predetermined key to the CM. For example, PAN master device 103 may authenticate itself via a certificate-based authentication protocol, such as using IPsec (Internet Protocol Security) or TLS (Transport Layer Security), or the PAN master device may provide the CM with a signed assertion that the CM can validate. CM 144 would validate the signature on such an assertion through standard public key crypto-graphical means. For example, CM 144 may acquire a certificate from a Certificate Authority (CA, not shown) for the creator of the assertion and validate the certificate (again, using standard public key crypto-graphical means) and then retrieve the public key from that certificate to validate the signature on the assertion. The certificate used in this process may include one or more of a derived (from the public key) key, an identification of PAN 106, a list of identifiers of other mobile devices (for example, PAN master device 103) eligible to join the ECN.

At this point, CM 144 bridges (532) all traffic between PAN master device 103 and PAN slave device 102 via the ECN, that is, via WAN wireless links 130 and 113 and CM 144. That is, PAN master device 103 and PAN slave device 102 exchanges PAN communications with each other via WAN wireless links 130 and 113 and CM 144, thus creating a virtual collaborative link 128 with PAN slave device 102 and a virtual extension of PAN 106, that is to say, PAN 106 is extended via WAN 140. Thus, a hybrid collaborative network is established, wherein collaborative devices 103 and 104 directly collaborate via PAN 106, and collaborative device 102 communicates with collaborative devices 103 and 104 via PAN 106 and WAN 140, creating a virtual extension of PAN 106, that is, the ECN. Signal flow diagram 500 then ends.

In another embodiment of the present invention, CM 144 may continue to broadcast the ECN identifier even after joining PAN slave device 102 to the ECN. In one such embodiment, CM 144 may broadcast the ECN identifier only for a limited time, after which it will continue bridging traffic for the ECN but only re-broadcast the ECN identifier if instructed to do so by the PAN master device 103.

In yet other embodiments of the present invention, all communications between PAN master device 103 and CM 144 may be via AP 122. For example, when PAN master device 103 realizes that PAN slave device 102 no longer is connected to the PAN master device, the PAN master device may associate with AP 122 and establish a wireless link 124 with the AP, and then communicate with CM 144 via the AP and wireless links 124 and 126.

In still other embodiments of the present invention, PAN slave device 102 may operate to establish an ECN that links multiple PANs 106, 160 together via WAN 140. That is, when PAN slave device 102 roams out of range of PAN 106, the PAN device may roam into the coverage area of second PAN 160 and join PAN 160 in accordance with known techniques, that is, pairing up, or connecting, with mobile devices 162 and 164 via their short range, network interfaces 206 and corresponding short range wireless links 167 and 168. PAN slave device 102 then may operate to create a virtual extension of PAN 106 to PAN 160.

In one such embodiment of the present invention, PAN 160 may include a PAN master device, for example, mobile device 164, that serves as a relay node for the other mobile devices of the PAN with WAN 140 via a wireless link 170, and one or more PAN slave devices, such as mobile device 162. When mobile device 102 joins PAN 160 and detects a broadcast indicating the availability of the second network service, mobile device 102 determines that it recognizes the ECN identifier included in the broadcast and joins the ECN via PAN 160 mater device 164. That is, mobile device 102 conveys to CM 144, via PAN 160 master device 164 and wireless link 170, the ECN identifier. As part of the joining of the ECN, PAN slave device 102 further may authenticate with CM 144 via PAN 160 master device 164 and wireless link 170. CM 144 then bridges all traffic between PAN master device 103 and mobile device 102 via the ECN, that is, via WAN wireless links 113 and 170, CM 144 and mobile device 164. That is, PAN master device 103 and PAN slave device 102 exchange PAN communications with each other via WAN wireless links 113 and 170, CM 144, and mobile device 164, and PAN 160 mobile devices 162 and 164 may exchange communications with PAN 106 via PAN 106 slave device 102. Thus, mobile device 102 provides a distribution point for communications between the mobile devices 162, 164 of PAN 160 and the mobile devices 103, 104 of PAN 106 and a virtual collaborative link is provided between PAN master device 103 and PAN slave device 102 and a virtual extension of PAN 106 to PAN 160 is provided via WAN 140.

In another such embodiment of the present invention, when mobile device 102 joins PAN 160 and detects a broadcast indicating the availability of the second network service, mobile device 102 determines that it recognizes the ECN identifier included in the broadcast and joins the ECN via a wireless link 132 with WAN 140. That is, mobile device 102 conveys to CM 144, via wireless link 132, the ECN identifier. As part of the joining of the ECN, PAN slave device 102 further may authenticate with CM 144 via wireless link 132. Further, mobile device 102 may establish itself as a PAN master device, that is, a relay node, for PAN 160 in accordance with known techniques. CM 144 then bridges all traffic between PAN master device 103 and mobile device 102 via the ECN, that is, via WAN wireless links 113 and 132 and CM 144. PAN master device 103 and PAN slave device 102 then may exchange PAN communications with each other via WAN wireless links 113 and 132 and CM 144, and in turn mobile device 102 may provide a distribution point for communications between the mobile devices of PAN 160 and the mobile devices of PAN 106. Thus, a virtual collaborative link is provided between PAN master device 103 and PAN slave device 102, a virtual extension of PAN 106 is provided via WAN 140, and PANs 106 and 160 are linked via WAN 140. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bridging a Personal Area Network (PAN) with a wide area network (WAN) at an access point (AP), the method comprising:
   receiving, from a first mobile device, a request to authenticate with a collaboration manager service for a first network service;
   receiving, from the first mobile device, a request to establish a second network service, wherein the second network service provides for bridging a PAN with a WAN via a collaboration manager server;
   determining a credential to be used by mobile devices who wish to join the second network service;
   determining that the first mobile device is authorized to make such a request;
   establishing the second network service;
   receiving, from a second mobile device, a request to join the second network service, wherein the request to join the second network service comprises the credential;
   joining the second mobile device to the second network service; and
   in response to joining the second mobile device to the second network service, bridging traffic between the first mobile device and the second mobile device using the second network service;
   wherein determining that the first mobile device is authorized to make such a request comprises authenticating the first mobile device;
   wherein determining the credential comprises:
      receiving the credential from the first mobile device in the request to establish the second network service; or
      generating the credential and conveying the credential to the first mobile device;
   wherein the credential comprises a routing address of a collaboration manager server.

2. The method of claim 1, wherein joining the second mobile device to the second network service comprises:
   authenticating the second mobile device.

3. The method of claim 1, further comprising:
   broadcasting a message identifying the second network service, wherein the message comprises the credential; and
   in response to advertising the second network service, receiving, from a second mobile device, a request to join the second network service.

4. The method of claim 3, wherein the request comprises the credential included in the message.

5. The method of claim 1, wherein the first and second mobile devices were part of a first Personal Area Network (PAN), and further comprising:
- disconnecting, by the second mobile device, from a PAN connection to the first PAN;
- connecting, by the second mobile device, to a second PAN different from the first PAN; and
- wherein bridging traffic between the first mobile device and the second mobile device using the second network service comprises linking mobile devices of the first PAN with mobile devices of the second PAN via the second network service.

6. A collaboration manager server capable of for bridging a Personal Area Network (PAN) with a wide area network (WAN), the collaboration manager server comprising:
- a processor;
- an at least one memory device that is configured to store a set of instructions that, when executed by the processor, perform the following functions:
  - receive, from a first mobile device, a request to authenticate with an access point for a first network service;
  - receive, from the first mobile device, a request to establish a second network service, wherein the second network service provides for bridging a PAN with a WAN;
  - determine a credential to be used by mobile devices who wish to join the second network service;
  - determine that the first mobile device is authorized to make such a request;
  - establish the second network service;
  - receive, from a second mobile device, a request to join the second network service, wherein the request to join the second network service comprises the credential;
  - join the second mobile device to the second network service; and
  - in response to joining the second mobile device to the second network service, bridge traffic between the first mobile device and the second mobile device using the second network service;
- wherein determining that the first mobile device is authorized to make such a request comprises authenticating the first mobile device;
- wherein joining the second mobile device to the second network service comprises authenticating the second mobile device;
- wherein the set of instructions further comprises instructions that when executed by the processor, perform the following functions:
  - broadcast a message identifying the second network service, wherein the message comprises the credential; and
  - in response to advertising the second network service, receive, from a second mobile device, a request to join the second network service;
- wherein the request comprises the credential included in the message.

7. The collaboration manager server of claim 6, wherein determining the credential comprises:
- receiving the credential from the first mobile device in the request to establish the second network service; or
- generating the credential and conveying the credential to the first mobile device.

8. The collaboration manager server of claim 6, wherein the credential comprises a routing address of a collaboration manager server.

* * * * *